US007499954B2

(12) United States Patent
Cherkauer et al.

(10) Patent No.: US 7,499,954 B2
(45) Date of Patent: Mar. 3, 2009

(54) CONSISTENT REINTEGRATION OF A FAILED PRIMARY INSTANCE

(75) Inventors: Kevin J. Cherkauer, Portland, OR (US); Scott D. Lashley, Portland, OR (US); Steven R. Pearson, Portland, OR (US); Effi Ofer, Thornhill (CA); Xun Xue, Markham (CA); Roger L. Q. Zheng, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 341 days.

(21) Appl. No.: 10/978,548

(22) Filed: Nov. 1, 2004

(65) Prior Publication Data

US 2006/0095478 A1 May 4, 2006

(51) Int. Cl.
*G06F 17/30* (2006.01)
(52) U.S. Cl. ............................. 707/202; 714/15; 711/1; 711/5
(58) Field of Classification Search ................. 707/202, 707/203, 102; 714/15; 711/1, 5
See application file for complete search history.

(56) References Cited

U.S. PATENT DOCUMENTS

| | | | | |
|---|---|---|---|---|
| 4,945,474 A * | 7/1990 | Elliott et al. | ................... | 714/16 |
| 5,740,433 A | 4/1998 | Carr et al. | ................... | 707/202 |
| 5,745,753 A | 4/1998 | Mosher, Jr. | ................... | 707/202 |
| 5,794,252 A | 8/1998 | Bailey et al. | ................ | 707/202 |
| 5,799,322 A | 8/1998 | Mosher, Jr. | ................. | 707/202 |
| 5,799,323 A | 8/1998 | Mosher, Jr. et al. | ......... | 707/202 |
| 5,835,915 A | 11/1998 | Carr et al. | ................... | 707/202 |
| 5,870,757 A * | 2/1999 | Fuller | ......................... | 707/201 |
| 5,884,328 A | 3/1999 | Mosher, Jr. | ................. | 707/202 |
| 5,937,414 A | 8/1999 | Souder et al. | ............... | 707/203 |
| 5,951,695 A | 9/1999 | Kolovson | ...................... | 714/16 |
| 6,163,856 A | 12/2000 | Dion et al. | ..................... | 714/4 |
| 6,338,126 B1 | 1/2002 | Ohran et al. | ................ | 711/162 |
| 6,377,959 B1 * | 4/2002 | Carlson | ...................... | 707/202 |
| 6,409,310 B1 | 6/2002 | Frenkel et al. | ................ | 347/54 |
| 6,553,392 B1 | 4/2003 | Mosher, Jr. et al. | ......... | 707/204 |
| 6,584,477 B1 * | 6/2003 | Mosher, Jr. | ................. | 707/204 |
| 6,625,751 B1 * | 9/2003 | Starovic et al. | ............... | 714/11 |
| 6,732,124 B1 * | 5/2004 | Koseki et al. | ............... | 707/202 |

(Continued)

OTHER PUBLICATIONS

Lyon, "Tandem's Remote Data Facility", IEEE Compcon Spring 1990 Digest of Papers, pp. 562-567.

(Continued)

*Primary Examiner*—Jean M Corrielus
*Assistant Examiner*—Noosha Arjomandi
(74) *Attorney, Agent, or Firm*—Lieberman & Brandsdorfer, LLC

(57) ABSTRACT

A method and system are provided for providing a consistent reintegration of a failed primary instance as a new secondary instance with implementation of truncation of log records. Upon failure of a primary instance, a secondary instance may be reassigned as the new primary instance. Prior to reintegration, any portion of the database log of the failed primary that is after the log position of the new primary instance may be truncated, followed by a comparison of the log positions of both the new primary instance and the new secondary instance. In limited circumstances, the truncation of the log data generated by the failed primary instance after the point of failure is possible, and supports reintegration of the failed primary as a new secondary instance with limited overhead.

12 Claims, 5 Drawing Sheets

U.S. PATENT DOCUMENTS

| | | | |
|---|---|---|---|
| 7,177,886 B2* | 2/2007 | Pruet, III | 707/204 |
| 2002/0184239 A1 | 12/2002 | Mosher, Jr. et al. | 707/200 |
| 2002/0194203 A1 | 12/2002 | Mosher, Jr. | 707/200 |
| 2002/0194204 A1 | 12/2002 | Mosher, Jr. et al. | 707/200 |
| 2003/0050930 A1 | 3/2003 | Mosher, Jr. et al. | 707/9 |
| 2006/0117074 A1* | 6/2006 | Ezzat | 707/202 |
| 2006/0218206 A1* | 9/2006 | Bourbonnais et al. | 707/202 |
| 2006/0259525 A1* | 11/2006 | Bae et al. | 707/202 |

OTHER PUBLICATIONS

Reuter et al., "Transaction Processing: Concepts and Techniques", 1993, pp. 646-653.

Azagury et al., "Bounding Journal Back-Off During Recovery of Data Base Replica in Fault-Tolerant Clusters", IBM Technical Disclosure Bulletin, Nov. 1993.

* cited by examiner

CONSISTENT REINTEGRATION OF A FAILED PRIMARY INSTANCE

BACKGROUND OF THE INVENTION

1. Technical Field

This invention relates to a method and system for reintegrating a failed primary instance into a log shipping data replication system. More specifically, the invention relates to preserving consistency between the failed primary instance and a second instance in conjunction with the reintegration.

2. Description of the Prior Art

Large modern database management systems are commonly found in terabyte sizes on systems containing hundreds of CPUs and thousands of spindles. A history of changes made to the database is stored in a database log. In general, recovery techniques associated with database recovery reset a system or data in a system to an operable state following damage and provide a process of rebuilding databases by restoring a backup copy and rolling forward the logs associated with the backup copy.

In log shipping data replication, a primary instance of a database transfers copies of its log records to a secondary database instance where the logged operations are replayed. The secondary database instance is typically unavailable for update during normal operations, but is available to become the new primary instance in case of a failure of the original primary instance. After a primary instance fails, it may be successfully restarted at a later time. However, if during the time interval from when the original primary instance fails until it is later restarted the secondary becomes the new primary, the two copies of the database need to be synchronized to avoid maintaining two separate yet inconsistent copies of the database.

FIG. 1 is a block diagram (10) conceptually depicting a primary data processing system (30) operational with a standby data processing system (50). The standby data processing system (50) is initialized from a full copy of the primary data processing system (30). The primary data processing system is hereinafter referred to as a primary instance. Similarly, the standby data processing system is hereinafter referred to as a secondary instance. There may be multiple standby instances, but for illustrative purposes only one is shown. The standby system (50) and associated databases can also be considered secondary instances, and the terms can be used interchangeably. The primary instance (30) includes a database agent (32) for performing updates to database pages in memory (not shown). Updates to database pages remain in the database page cache (34) until a record of the update is written to disk (38) in a local copy of the database log file by a page cleaner (36). The log file (not shown) is a record of all changes made to the primary instance (30). Log records are first created and accumulated in the memory pages of log buffers (40). The log records are periodically written to disk (44) by a log writer (42). When a log shipping data replication subsystem is deployed, log pages are periodically accessed either from the log buffers in memory (40) or by reading the pages into memory from the database log disk (44) and sent over a communication network (48) to a standby instance (50). The log data is sent by a log shipping agent (46), or a log writer (not shown) of the primary instance (30) to a log receiving agent (52) of the standby instance (50). The log receiving agent (52) accepts log data from the communication link (48) and stores received log data in memory pages of a log buffer (54) in the memory of the standby instance (50). Periodically, the received log pages are written to disk (58) by a log writer (56). In addition, a log replay agent (60) is provided to access the log pages from the log buffers (54) and apply the effects of the changes reflected in the log records to the copy of the database in the standby instance (50). The log replay agent (60) may replay the log records directly to disk (66), or it may replay the log pages by updating data pages in the database page cache (62) which is periodically written to a database disk (66) via the page cleaner (64). By continuously shipping log records from the primary instance (30) to the standby instance (50), and replaying the log records against the copy of the standby instance (50), the standby instance maintains a replica of the primary instance (30).

There are three possible scenarios representing how much of what constitutes the database log is present at a primary instance and at a standby instance at the point of failure of the primary instance. The primary instance can have less, the same amount, or more log data than the standby instance. Since log data is typically written first to the primary instance and then shipped to the standby instance, it is most common for the primary instance to have more or an equal amount of data compared to the standby instance.

In the cases where the primary and standby instances have an equal amount of log data or the primary instance has less log data than the standby instance, no special treatment of the primary instance is necessary in order to make it consistent with the standby instance if the original primary instance is restarted after a failover. When the standby takes over control of the database, it becomes the new primary instance. The new primary instance processes all of the received log data and begins new database operations. New log data is generated starting at the point immediately after the last log data received prior to the failure of the old primary instance. If the old primary instance is repaired and restarted, it can rejoin the log shipping data replication scheme by taking on the role of the new standby instance and have the new primary instance start shipping log data to it beginning from the next log position after its current end of log. Accordingly, in either of these scenarios the result will yield two copies of the database having identical logs, and as the log records are replayed, substantially identical databases.

In the case where the old primary instance has a greater amount of log data than the new primary instance, maintaining consistency between the two instances becomes problematic. For example, it is likely that the new primary started processing transactions even though some log data from the old primary never made it to the new primary. Accordingly, in this scenario the result will yield two copies of the database with each instance having logs which may differ, and, if the log records are all applied to each instance, inconsistent copies of the database.

There are two known methods for consistently resynchronizing a previously failed primary instance of a database system with a new primary instance. The first method restores a copy of a failed primary instance and then applies successive log data according to the log stream of the new primary instance. The successive log data may be applied by way of a rollforward recovery operation, by reversing the direction of log shipping data replication, or by a combination thereof. The process of restoring and recovering the database using the new primary instance version of log history removes any inconsistencies from the old primary instance as compared to the new primary instance. However, the first method is not always desirable, such as in a large database installation. This restore and recovery method requires a significant contribution of time and operational resources. The second method captures the position of the last complete log record received by the new primary instance at the time of takeover from the failed primary instance. When the failed primary instance restarts as a new secondary instance, an "undo" procedure is performed for all log records found in the log of the failed primary instance after the position of the last record that was successfully transferred to the new primary instance prior to the failover. However, this method assumes that all operations may be processed through the undo procedure using a normal recovery process of a database system. It is in general very complicated, and in some database management systems impossible, to implement the gamut of undo processing necessary to rectify all cases of inconsistency between a primary instance and a standby instance. For example, it is a common practice in database management systems to perform a variety of "not undoable" operations, such as recycling the disk space previously used by deleted database objects, in conjunction with the irrevocable completion of a database transaction which necessitates such an operation. Once such an operation takes place, there is commonly no means in a database management system to accurately and reliably undo its effects. Accordingly, there is a need for reintegrating a failed primary instance into a new secondary instance without performing restore or undo operations.

There is therefore a need for a method and system that supports safely truncating log records on a failed primary instance prior to reintegrating the failed primary instance with a new primary instance. The method and system should support determining when it is safe to perform a log truncation, and when the truncation can be performed for a portion of the extra log data on the failed primary instance.

SUMMARY OF THE INVENTION

This invention comprises a method and system for reintegrating a failed primary instance into a log shipping data replication system as a new secondary instance.

In one aspect of the invention, a method is provided to maintain a status of an operational mode of a primary instance in persistent storage. A takeover log position is saved in persistent storage of the secondary instance during a failover. Following the failover, it is determined if log data of the failed primary instance generated after the takeover log position can be truncated. Log data that exists after the takeover log position on the failed primary instance is truncated if there has been a positive determination. Thereafter, the takeover log position is compared to a final log position in persistent storage of the failed primary instance, and based upon the comparison it is decided if the failed primary instance can be reintegrated as the new secondary instance. If a positive decision is attained, the failed primary instance is reintegrated as a new secondary instance.

In another aspect of the invention, a system is provided to decide if a failed primary instance may be reintegrated as a new secondary instance. A status of an operational mode of the primary instance is maintained in persistent storage. During failover of the primary instance, a takeover log position is saved in persistent storage at the secondary instance. A data manager determines if log data of the failed primary instance that occurs after the takeover log position can be truncated. In response to a position determination of the data manager, a truncation manager truncates log data that occurs on the failed primary instance after the takeover log position. A comparison manager compares the takeover log position with a final log position in persistent storage of the failed primary instance, and a decision manager decides if the failed primary instance can be reintegrated as a new secondary instance in response to a communication received from the comparison manager. In response to receipt of a positive communication from the decision manager, a reintegration manager reintegrates the failed primary instance as said new secondary instance.

In yet another aspect of the invention, an article is provided in a computer-readable signal-bearing medium. Means in the medium are provided for maintaining a status of an operational mode of a primary instance in persistent storage. During failover of the primary instance, means in the medium are provided for saving a takeover log position in persistent storage at a secondary instance. In addition, means in the medium are provided for determining if log data of the failed primary instance that occurs after the takeover log position can be truncated. In response to a positive determination, means in the medium are provided for truncating log data that occurs on the failed primary instance after the takeover log position. Means in the medium are also provided for comparing the takeover log position with a final log position in persistent storage of the failed primary instance and for deciding if the failed primary instance can be reintegrated as a new secondary instance. In response to a positive comparison, means in the medium are provided for reintegrating the failed primary instance as a new secondary instance. Other features and advantages of this invention will become apparent from the following detailed description of the presently preferred embodiment of the invention, taken in conjunction with the accompanying drawings.

DESCRIPTION OF THE PREFERRED EMBODIMENT

Overview

In a database management system, log records of a primary instance, i.e., primary data processing system, are periodically communicated to a secondary instance, i.e., standby data processing system. Upon failure of a primary instance, a secondary instance may be reassigned as the new primary instance. Following any recovery of the failed primary instance, it may be reintegrated into the database system as a new secondary instance. During the reintegration process, a portion of the database log of the failed primary that contains log entries occurring subsequent to a takeover log position of the new primary instance may be truncated, followed by a comparison of the log positions of both the new primary instance and the new secondary instance to insure data integrity. In limited circumstances, the truncation of the log data generated by the failed primary instance after the point of failure enables reintegration of the failed primary instance as a new secondary instance with limited overhead.

Technical Details

There are two principal mechanisms that are employed to enable consistent reintegration of a failed primary instance with a new primary instance. The first mechanism identifies the circumstances under which it is safe to reintegrate a previously failed primary instance as a new secondary instance without modifying the contents of the previously failed primary instance. The log position of the last received log data from the secondary instance is compared with the log position of the failed primary instance when the failed primary instance tries to restart as a new secondary instance. The second mechanism truncates, i.e., removes, any log data at the failed primary instance that is subsequent to the log position of the last received log data from the secondary instance when it is considered safe. The ability to safely truncate the log data and to reintegrate the failed primary instance with the secondary instance is ensured in certain operating modes and circumstances.

Figure 3:
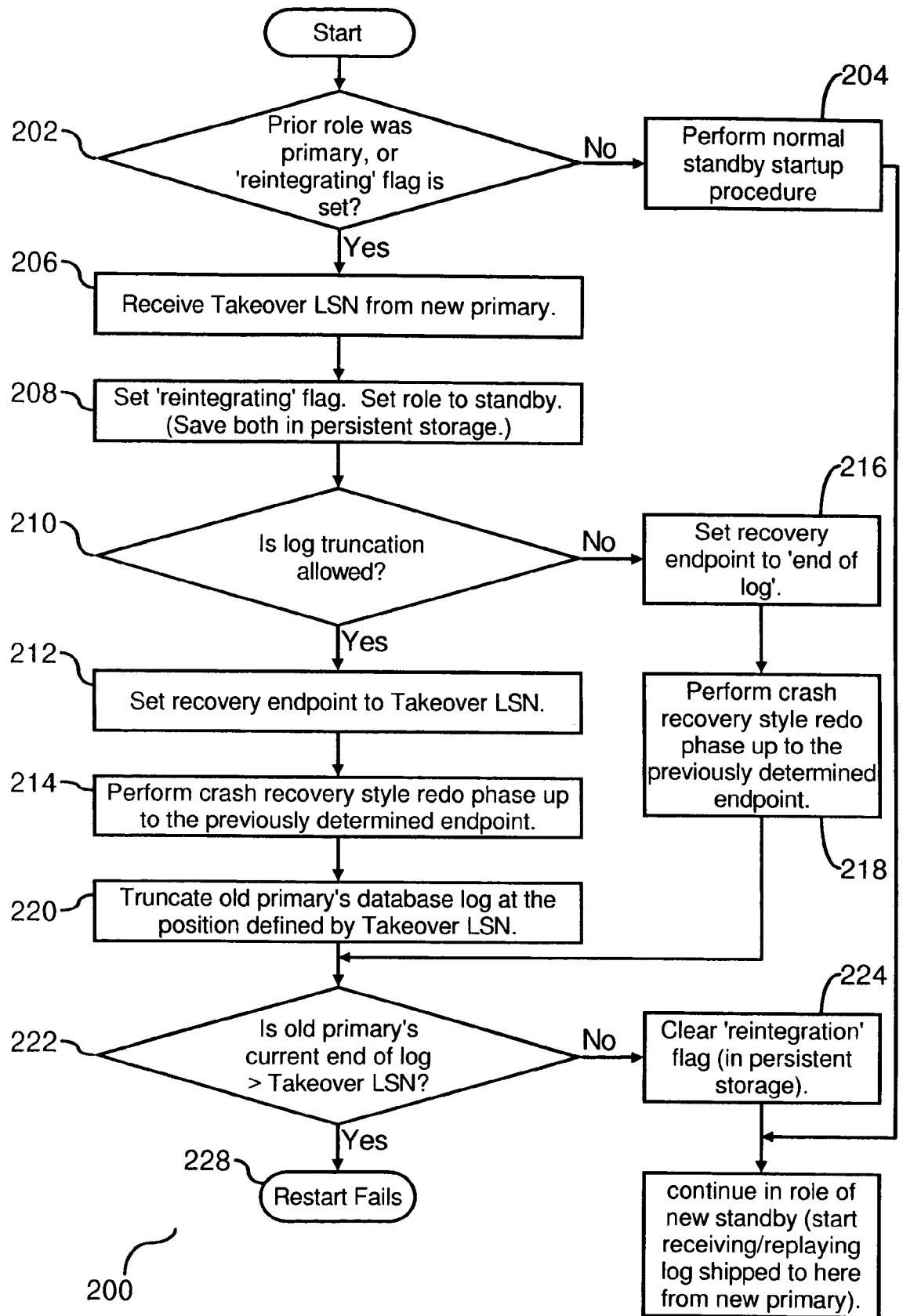
FIG. 3 is a flow chart illustrating a process for reintegrating a failed primary instance as a new secondary instance according to the preferred embodiment of this invention, and is suggested for printing on the first page of the issued patent.
Figure 4:
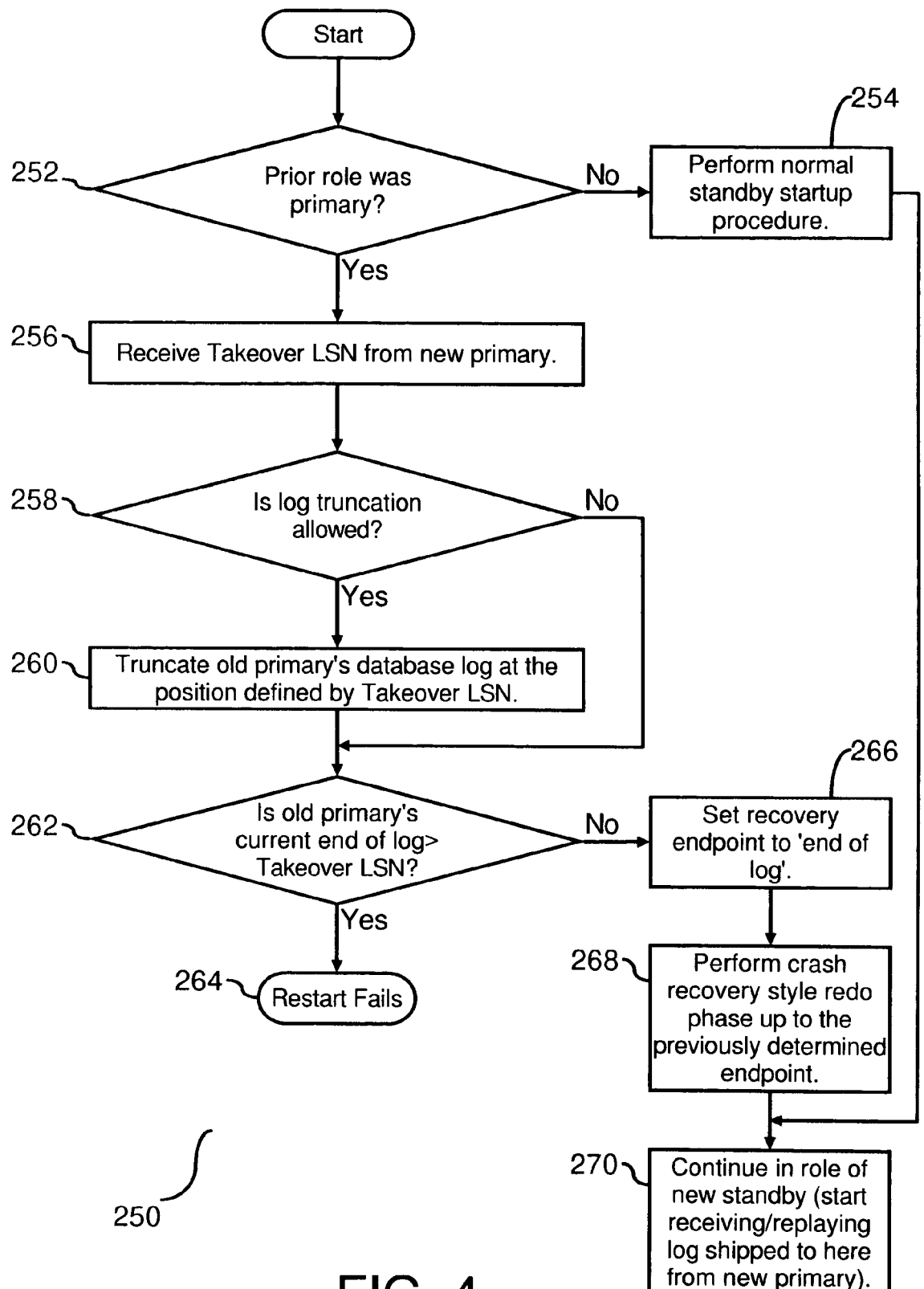
FIG. 4 is a flow chart illustrating an alternative process for reintegrating a failed primary instance as a new secondary instance.

In both of the embodiments shown in FIGS. 3 and 4 pertaining to processes for reintegrating a failed primary instance as a new secondary instance, the optional truncation of certain recent log data at the failed primary and the reintegration of the failed primary into the log shipping data replication system as a new standby for the new primary is only permitted in circumstances where the reintegration does not impair consistency between the two instances. Truncation followed by reintegration without affecting consistency is only ensured in two situations. The first situation is if the failed primary was operating in a mode where it would not perform any post log write action in response to a successful writing of log data to persistent storage in a log of the primary instance without first receiving a positive acknowledgment from the secondary instance, where the acknowledgement indicates that the secondary instance received the associated data and wrote them to persistent storage in the secondary instance. A post log write action may include a flushing of a database page to persistent storage from a buffer pool of the primary instance, or any direct writing to persistent storage, also known as a buffer pool bypassing operation, that occurs after log records are known to have reached persistent storage at the primary instance. The second situation is if both of the following occur: (a) the failed primary was operating in a mode where it would not perform any post log write actions without first receiving an acknowledgment from the secondary instance that the secondary instance received the log records in memory, and (b) the secondary instance retained the acknowledged log data in memory until it was written to persistent storage in the secondary instance. Both of the above situations enable a consistent reintegration of the failed primary instance with the new primary instance as a new secondary instance.

Log shipping data replication systems typically provide a selection of synchronization modes that govern how far behind the primary instance the secondary instance is permitted to lag. The present invention leverages the semantics of these synchronization modes when determining if the necessary conditions exist to truncate log data from a failed primary instance. In the embodiments described herein, three such synchronization modes are operable. A first mode is known as the synchronous mode (SYNC), where the primary instance considers a transaction committed when it receives a confirmation acknowledgment message from the secondary instance indicating that the associated log data has been received and written to persistent storage at the secondary instance. In the SYNC mode, a transaction committed at the primary instance can only be lost from the secondary instance in a failover if the secondary instance fails and its log disk becomes unreadable. A second mode is known as the asynchronous mode (ASYNC), where the primary instance considers a transaction committed when it successfully submits the relevant log data to the network in communication with the secondary instance. In the ASYNC mode, the primary instance does not wait to receive an acknowledgment that the log data was received by the secondary instance. A third mode is known as the near-synchronous mode (NEARSYNC), where the primary instance considers a transaction committed when it receives a message from the secondary instance confirming that the log data has been received and written to the main memory of the secondary instance. In the NEARSYNC mode, the acknowledgement is returned to the primary instance faster than in the SYNC mode because there is no delay for the secondary instance to write the received data to the log disk. However, in the NEARSYNC mode, the acknowledged data could be lost from the secondary instance if there is a failure at the secondary instance after the acknowledgement is sent and before the log data is successfully written to persistent storage. Each of the SYNC, ASYNC and NEARSYNC modes are applicable during states in which logs are shipped from the primary instance to the secondary instance whenever the primary instance flushes a log page to disk; such states are referred to herein as "peer" states. Both the synchronization mode and the operational state (peer or otherwise) of a primary instance are maintained in persistent storage so that the values applicable at the time of a failure can be retrieved and consulted when said primary instance is later restarted.

Figure 1:
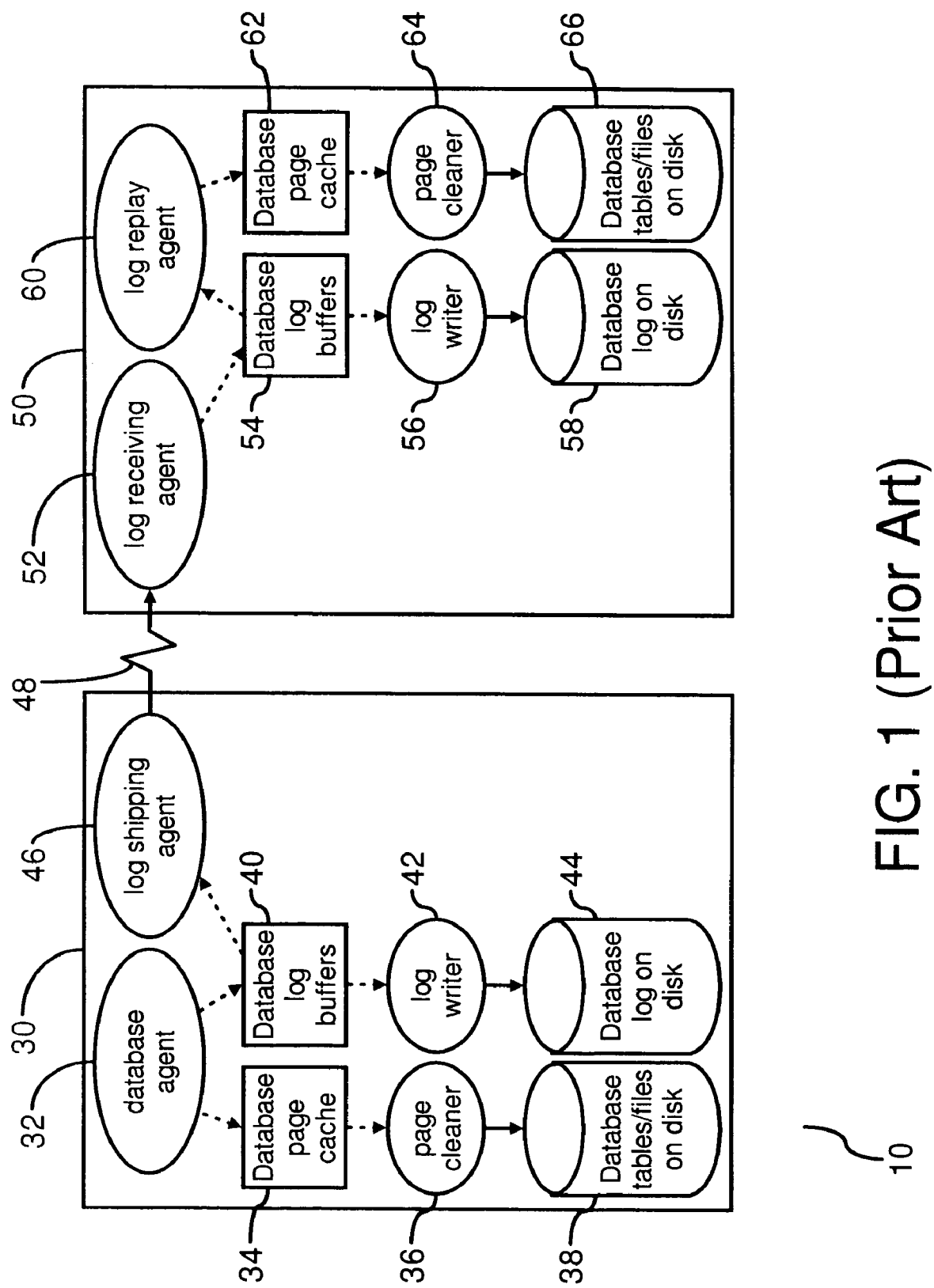
FIG. 1 is a block diagram of a prior art database system with log shipping data replication deployed.
Figure 2:
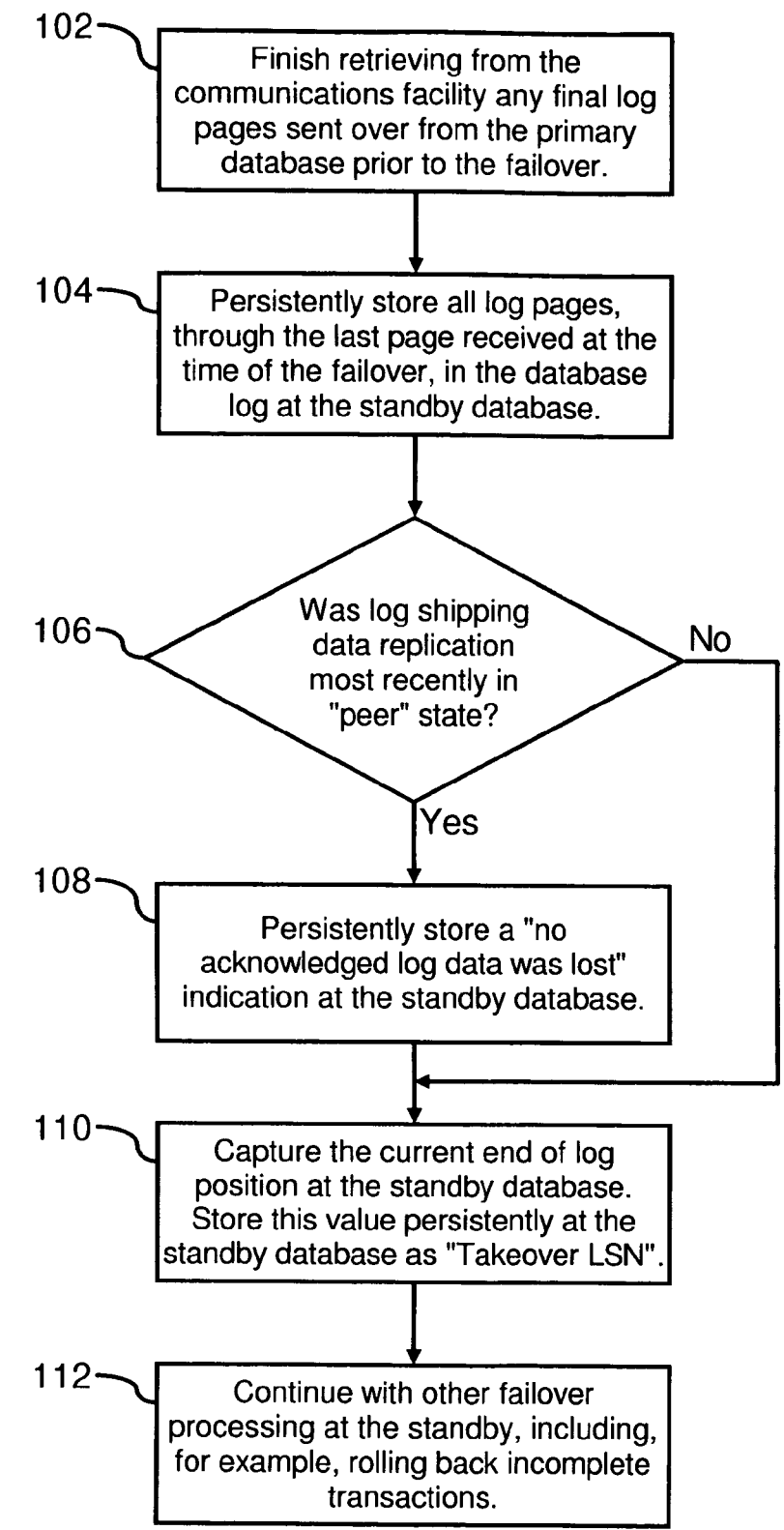
FIG. 2 is a flow chart illustrating a process for capturing a last recorded sequence number of a secondary instance.

All log data generated by the primary instance and forwarded to the secondary instance has a number identifying the data and its position in the log. This number is known as a log sequence number. In order to identify if log data of a failed primary instance can be truncated, the last received log sequence number of the secondary instance must be identified. The last received log sequence number by the secondary instance that is persistently stored is also known as a takeover log sequence number. FIG. 2 is a flow chart (100) illustrating a process for capturing a last recorded log sequence number of a secondary instance during failover of a primary instance. Prior to the failover, the secondary instance finished retrieving any final log pages sent from the primary instance (102). All log pages are stored persistently in the database log of the secondary instance (104). The stored log pages of step (104) include the last page received at the time of the failover. Thereafter, a test is conducted to determine if the secondary instance was operating in a peer state with the primary instance (106). A positive response to the test at step (106) will result in persistently storing an indication in the secondary instance that no acknowledged log data was lost (108). Following either step (108) or as the result of a negative response to the test at step (106) processing continues with the capture of the current end of the log position of the secondary instance, and storing the value associated with the end of the log position persistently at the secondary instance as the takeover log sequence number (110), also known as a takeover log position. Finally, any remaining failover processing is completed at the secondary instance, including rolling back any incomplete transactions (112).

The process of determining if certain recent log data on a failed primary instance can be truncated contributes to determining if the failed primary instance can be reintegrated as a secondary instance while maintaining consistency among the copies of the database at the primary and secondary instances. FIG. 3 is a flow chart (200) illustrating startup of a standby instance including one embodiment of a process for reintegrating a failed primary instance. A test (202) is conducted to determine if either the prior role of the restarting instance was as a primary instance, or if a prior reintegration attempt was started but not yet completed, as indicated by a reintegration flag set in the persistent storage of the failed primary instance. A negative response to the test at step (202) will result in a conventional start up procedure for a failed secondary instance (204). However, a positive response to the test at step (202) will result in the failed primary instance receiving a last received log sequence number from the former secondary instance which is now operating as a new primary instance (206). Thereafter, an indicator that reintegration processing is underway is saved in the memory of the failed primary instance (208), and the failed primary instance is now reassigned as the new secondary instance (208). Both the reintegration flag and the role assignment designation of the new secondary instance are then saved in the persistent storage of the new secondary instance. A test is then conducted to determine if log truncation of the failed primary instance is allowed (210). The test at step (210) is shown in detail in FIG. 5. A value of true returned to the truncation manager will enable the truncation of the failed primary instance to proceed (212) by setting the recovery endpoint of the failed primary instance, i.e. the new secondary instance, to the takeover log sequence number of the new primary instance, i.e. the former secondary instance. Thereafter, a crash recovery procedure for the new secondary instance is conducted (214) up to the takeover log sequence number determined at step (212). Following the crash recovery procedure at step (214), the failed primary instance's database log is truncated at the position defined by the takeover log sequence position. However, if a value of false is returned to the truncation manager at step (210), this is an indication that the truncation of log data from the failed primary instance is not permitted. Accordingly, the recovery endpoint of the failed primary instance is set to the end of the primary instance's log as it presently exists (216). Thereafter, a crash recovery procedure of the new secondary instance is conducted up to the end of the log (218) as determined at step (216). Following crash recovery at step (218) or completion of truncation at step (220), a test is conducted to determine if the end of the log of the failed primary has a position number greater than the takeover log sequence position (222) as set at step (212). A negative response to the test at step (222) will result in clearing the reintegration flag in persistent storage (224) that was set at step (208). The failed primary instance from either step (204) or (224) may then continue in the role of a new secondary instance and start receiving and replaying log data shipped from the new primary instance (226). However, a positive response to the test at step (222) is an indication that the reintegration of the failed primary will result in incompatibility with the new secondary, and as such a failure message (228) is returned indicating that a reintegration of the failed primary instance as a new secondary instance is not permitted. Accordingly, this embodiment permits the failed primary instance to be reintegrated as a new secondary instance with truncation of the log data of the failed primary instance without sacrificing database consistency and integrity under limited circumstances.

FIG. 4 is a flow chart (250) illustrating startup of a standby instance including an alternative process for reintegrating a failed primary instance as a new secondary instance. An initial test is conducted to determine if the prior role of the now failed primary instance was a primary instance (252). A negative response to the test at step (252) will result in a conventional start up procedure for a failed secondary instance (254). However, a positive response to the test at step (252) will result in the failed primary instance receiving a last received log sequence number from the former secondary instance which is now operating as a new primary instance (256). A test is then conducted to determine if log truncation of the failed primary instance is Allowed (258). The test at step (258) is shown in detail in FIG. 5. A value of true returned to the truncation manager will enable log truncation of the failed primary instance to proceed. The log of the failed primary instance is truncated at the position defined by the takeover log sequence number of the secondary instance (260). Following step (260), or in response to a value of false being returned to the truncation manager at step (258), a subsequent test (262) is conducted to determine if the current end of the database log of the failed primary instance is greater than the takeover log sequence number of the secondary instance. A positive response to the test at step (262) will result in a failure of the restart of the failed primary instance as a new secondary instance (264). However, a negative response to the test at step (264) will result in setting the recovery endpoint of the failed primary instance as the end of the log (266), and performing a crash recovery of the failed primary instance up to the defined takeover log sequence number of the secondary instance (268). Following step (254) or step (268), the failed primary instance is reassigned as a new secondary instance and can start receiving log shipping data from the new primary instance (270). Accordingly, the process illustrated in FIG. 4 is an alternative process for truncating log data of the failed primary instance and reintegrating the failed primary instance into the log shipping data replication system as a new secondary instance without sacrificing database consistency.

Figure 5:
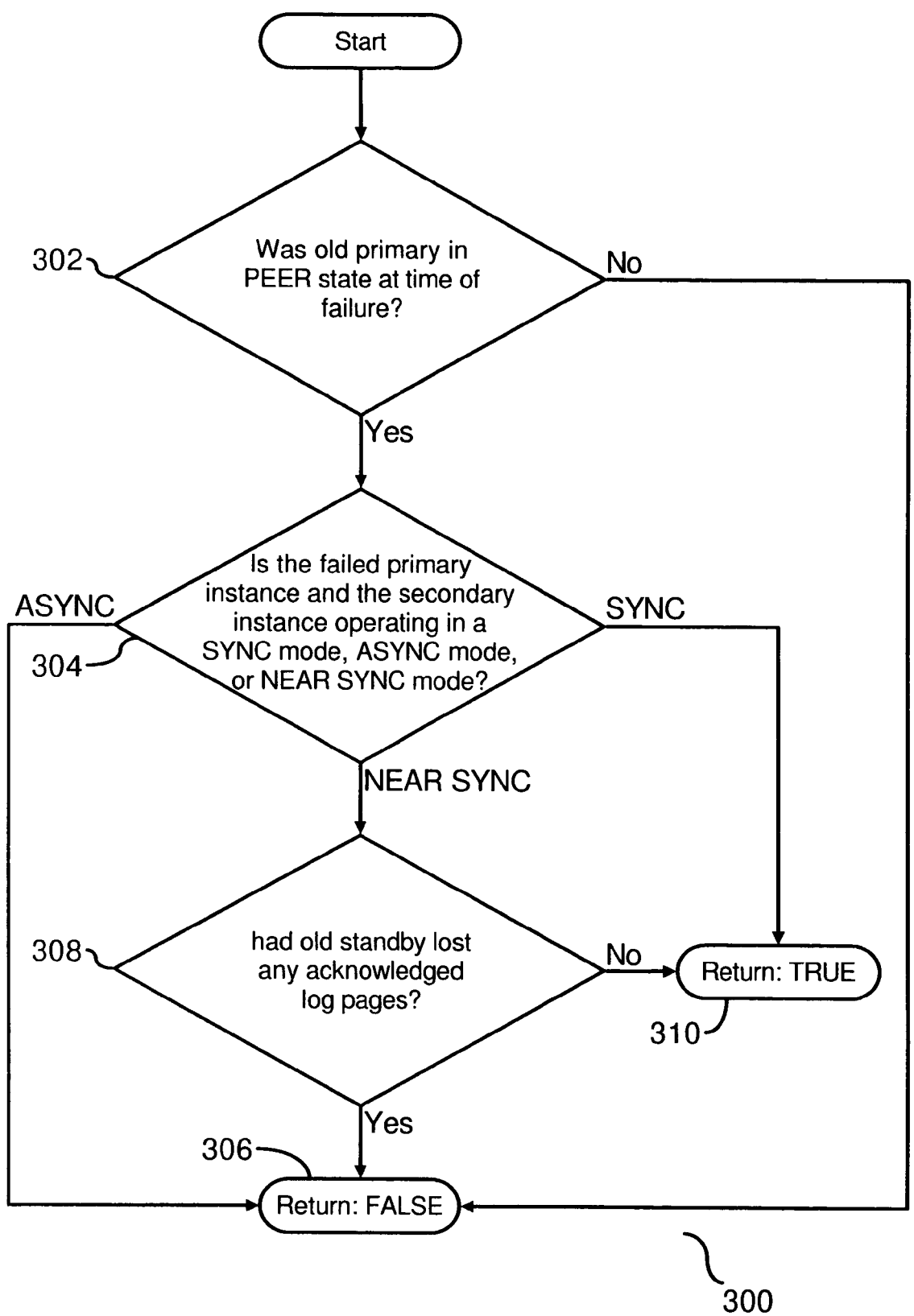
FIG. 5 is a flow chart illustrating a process for determining if log truncation of a failed primary is permitted.

When an attempt is made to restart a failed primary instance as a new standby instance, a determination is made as to whether truncation of log data that occurs after the takeover log position on the failed primary instance is permitted. FIG. 5 is a flow chart (300) demonstrating the process of this determination. Initially, a test is conducted to determine if the failed primary instance was operating in a peer state with the secondary instance at the time of failure (302). A positive response to the test at step (302) will result in a subsequent test to determine if the failed primary instance and the secondary instance were operating in a SYNC mode, an ASYNC mode, or a NEARSYNC mode at the time of failure of the primary (304). If it is determined that the failed primary instance and the secondary instance were operating in a SYNC mode at the time of failure of the primary instance a value of true is returned to a truncation manager (310). However, a negative response to the test at step (302) or a determination that the failed primary instance and the secondary instance were operating in an ASYNC mode at the time of failure of the primary instance will result in a value of false returned to the truncation manager (306). If it is determined at step (304) that the failed primary instance and the secondary instance were operating in a NEARSYNC mode at the time of failure of the primary instance, a subsequent test is conducted to determine if the secondary instance lost any acknowledged log pages (308). A negative response to the test at step (308) will result in a value of true returned to the truncation manager (310). Similarly, a positive response to the test at step (308) will result in a value of false returned to the truncation manager (306). The truncation manager determines whether the log of the failed primary may be truncated prior to reintegrating the failed primary instance with the secondary instance subsequent to failover. Accordingly, a determination of the operating modes of both the primary and secondary instances at the time of failure of the primary instance is a contributing factor in determining if log truncation of the failed primary instance is an option prior to reintegrating the primary instance as a secondary instance.

Advantages Over the Prior Art

A failed primary instance may be reintegrated into a system as a new secondary instance in an efficient and expedited manner. Log data that occurs before the takeover log position on the failed primary instance may be utilized by the new secondary instance, while log data that occurs after the takeover log position is truncated. If it is determined that the failed primary instance and the secondary instance were operating in a SYNC mode, the failed primary may perform a crash recovery up to the takeover log position and then be reintegrated with the new primary instance as the new secondary instance without performing restore or undo functions as log data is consistent between instances. The ability to truncate log data that has not been later acted upon at the failed primary instance avoids the need to use the much more costly full restore and recovery procedure or to implement a larger, more complex, and often simply impractical undo-based solution. Reintegration is possible in other modes as well, and is even likely to succeed in NEARSYNC mode. The system may be configured to use a certain log shipping mode to ensure a smooth reintegration in the event of failure of the primary instance. There is a performance trade-off in different operating modes, and such trade-offs should be taken into consideration to ensure that the circumstances fit the need.

Alternative Embodiments

It will be appreciated that, although specific embodiments of the invention have been described herein for purposes of illustration, various modifications may be made without departing from the spirit and scope of the invention. Of particular note, the primary and second instances should not be limited to instances of a disk-based database management system. The present invention may be applied as well to any log shipping data replication system, and may be deployed with a journaled file system, a main-memory database management system, or a disk based database management system. Accordingly, the scope of protection of this invention is limited only by the following claims and their equivalents.

We claim:

1. A method for reintegrating a failed primary instance into a log shipping data replication system as a new secondary instance, comprising:

maintaining a status of an operational mode of a primary instance in persistent storage;

saving a takeover log position in persistent storage at a secondary instance during failover from said primary instance;

truncating log data in a log file stored in persistent memory local to said failed primary instance that occurs after said takeover log position and prior to reintegrating said failed primary instance with a new primary instance, wherein the step of truncating includes removing any log data at the failed primary instance that is subsequent to the takeover log position;

comparing said takeover log position with a final log position in persistent storage of said failed primary instance;

reintegrating said failed primary instance after recovery as said new secondary instance in response to said comparison and without modifying contents of said failed primary instance; and determining failure of said failed primary instance was operating in a mode requiring an acknowledgment from said secondary instance of said log data received and written to persistent storage at said secondary instance before said failed primary instance allowed a post log write action in response to a successful writing of said log data to persistent storage in a log of said primary instance.

2. The method of claim 1, wherein the step of truncating log data of said failed primary instance that occurs after said takeover log position includes preserving consistency between said failed primary instance and said secondary instance.

3. The method of claim 1, further comprising determining said failed primary instance was operating in a mode requiring an acknowledgment from said secondary instance of said log data received in memory by said secondary instance before said failed primary instance allowed a post log write action in response to a successful writing of said log data to persistent storage in a log of said primary instance, and determining that said secondary instance retained said acknowledged log data in memory until having written said log data to persistent storage.

4. The method of claim 1, wherein said instance operates in conjunction with a system selected from the group consisting of: a journaled file system, a main-memory database management system, and a disk based database management system.

5. A system comprising:

a status of an operational mode of a primary instance adapted to be maintained in persistent storage;

a takeover log position adapted to be saved in persistent storage at a secondary instance during failover from said primary instance;

a truncation manager to truncate said log data stored in persistent memory local to a failed primary instance after said takeover log position and prior to reintegration of said failed primary instance with a new primary instance;

a comparison manager to compare said takeover log position with a final log position in persistent storage of said failed primary instance;

a reintegration manager adapted to reintegrate said failed primary instance after recovery as said new secondary instance in response to said comparison and without modification of content of said failed primary instance; and a mode manager to determine failure of said failed primary instance was operating in a mode requiring an acknowledgment from said secondary instance of said log data received and written to persistent storage at said secondary instance before said failed primary instance allowed a post log write action in response to a successful writing of said log data to persistent storage in a log of said primary instance.

6. The system of claim 5, further comprising a decision manager is adapted to preserve consistency between said failed primary instance and said new secondary instance.

7. The system of claim 5, further comprising said mode manager to determine failure of said failed primary instance was operating in a mode requiring an acknowledgment from said secondary instance of said log data receive in memory by said secondary instance, before said failed primary instance allowed a post log write action in response to a successful writing of said log data to persistent storage in a log of said primary instance, and to determine that said secondary instance retained said acknowledged log data in memory until having written said log data to persistent storage.

8. The system of claim 5, wherein said instances operate in conjunction with a system selected from the group consisting of: a journaled file system, a main-memory database management system, and a disk based database management system.

9. An article comprising:
- a computer-readable recordable data storage medium;
- means in the medium for maintaining a status of an operational mode of a primary instance in persistent storage;
- means in the medium for saving a takeover log position in persistent storage at a secondary instance during failover from said primary instance;
- means in the medium for truncating log data of said failed primary instance that occurs after said takeover log position and prior to reintegrating said failed primary instance with a new primary instance, wherein truncation includes removing any log data at the failed primary instance that is subsequent to the takeover log position;
- means in the medium for comparing said takeover log position with a final log position in persistent storage of said failed primary instance;
- means in the medium for reintegrating said failed primary instance after recover as said new secondary instance in response to said comparison and without modifying contents of said failed primary instance; and
- means in the medium for determining failure of said failed primary instance was operating in a mode requiring an acknowledgment from said secondary instance of log data received and written to persistent storage at said secondary instance before said failed primary instance allowed post log write action in response to a successful writing of said log data to persistent storage in a log of said primary instance.

10. The article of claim 9, wherein said means for truncating log data of said failed primary instance that occurs after said takeover log position preserves consistency between said failed primary instance and said secondary instance.

11. The article of claim 9, further comprising means in the medium for determining failure of said failed primary instance was operating in a mode requiring an acknowledgment from said secondary instance of log data receive in memory by said secondary instance, before said failed primary instance allowed a post log write action in response to a successful writing of said log data to persistent storage in a log of said primary instance, and determining that said secondary instance retained said acknowledged log data in memory until having written said log data to persistent storage.

12. The article of claim 9, wherein said instances operate in conjunction with a system selected from the group consisting of: a journaled file system, a main-memory database management system, and a disk based database management system.

* * * * *